(12) United States Patent
Rajwar et al.

(10) Patent No.: US 7,900,023 B2
(45) Date of Patent: Mar. 1, 2011

(54) TECHNIQUE TO ENABLE STORE FORWARDING DURING LONG LATENCY INSTRUCTION EXECUTION

(75) Inventors: Ravi Rajwar, Portland, OR (US); Srikanth T. Srinivasan, Portland, OR (US); Haitham Akkary, Portland, OR (US); Amit Gandhi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 262 days.

(21) Appl. No.: 11/015,874

(22) Filed: Dec. 16, 2004

(65) Prior Publication Data
US 2009/0063773 A1  Mar. 5, 2009

(51) Int. Cl.
*G06F 9/30* (2006.01)

(52) U.S. Cl. ........................ 712/216; 712/218; 712/219

(58) Field of Classification Search ................. 712/216, 712/218, 219
See application file for complete search history.

(56) References Cited

U.S. PATENT DOCUMENTS 5,878,242 A * 3/1999 Olson et al. ................. 712/216
6,021,485 A * 2/2000 Feiste et al. ................. 712/216
6,675,287 B1 * 1/2004 Gaskins et al. .............. 712/216

OTHER PUBLICATIONS

Baugh et al.; "Decomposing the Load-Store Queue by Function for Power Reduction and Scalability"; 2004.*
Office Action received for Chinese Patent Application No. 200510119155.8, mailed on Jun. 22, 2007, 6 pages of Office Action and 8 pages of English Translation.
Office Action received for Chinese Patent Application No. 200510119155.8, mailed on Dec. 14, 2007, 5 pages of Office Action and 8 pages of English Translation.
Office Action received for Chinese Patent Application No. 200510119155.8, mailed on Apr. 18, 2008, 4 pages of Office Action and 6 pages of English Translation.
Office Action received for Chinese Patent Application No. 200510119155.8, mailed on Dec. 18, 2009, 4 pages of Office Action and 6 pages of English Translation.

* cited by examiner

*Primary Examiner* — Alford W Kindred
*Assistant Examiner* — Benjamin P Geib
(74) *Attorney, Agent, or Firm* — Caven & Aghevli LLC

(57) ABSTRACT

A technique to allow independent loads to be satisfied during high-latency instruction processing. Embodiments of the invention relate to a technique in which a storage structure is used to hold store operations in program order while independent load instructions are satisfied during a time in which a high-latency instruction is being processed. After the high-latency instruction is processed, the store operations can be restored in program order without searching the storage structure.

32 Claims, 7 Drawing Sheets

TECHNIQUE TO ENABLE STORE FORWARDING DURING LONG LATENCY INSTRUCTION EXECUTION

FIELD

Embodiments of the invention relate to microprocessors and microprocessor systems. More particularly, embodiments of the invention relate to a technique to enable store data to be forwarded to load instructions having to search a queue for the store to be forwarded.

BACKGROUND

When performing load and store instructions, typical prior art microprocessors rely on a searchable queue containing content-addressable memory (CAM) logic, to enforce ordering among memory operations and for forwarding data corresponding to store instructions to load instructions while high-latency instructions are accessing data from memory ("pending"). High latency instructions can result from the instruction having to resort to a memory structure having a relatively slow access time, such as dynamic random access memory (DRAM), if the corresponding data is not present in a relatively faster memory structure, such as a cache memory. The lack of the desired data within a particular memory structure is commonly referred to as a "miss", while the presence of the data within a memory structure is commonly referred to as a "hit".

FIG. 1 illustrates a prior art processor architecture including logic for servicing instructions that are independent of a high-latency instruction. The prior art architecture of Figure can service instructions continuously without stalling the processor, including instructions that are independent of long-latency instructions, such as loads that are accessing data from a relatively slow memory source (e.g., DRAM). In particular, instructions decoded by the instruction decoder and allocated registers by the allocate and register renamer are stored as micro-operations (uops) in uop queues, from which they are scheduled for execution by the functional units and committed to the register file.

The prior art architecture of FIG. 1 allows miss-independent instructions to use register file and scheduler resources by forcing long-latency instructions and those instructions dependent upon the long-latency instructions to relent scheduling and register file resources until the miss can be serviced. This allows miss-independent instructions to execute and complete without being blocked by long-latency instructions or their dependents.

Instructions dependent on the long-latency instruction, in FIG. 1, are temporarily stored in a wait buffer, while independent instructions are serviced during the pendency of the long-latency instruction. However, in order to ensure correct memory ordering, all store instructions concurrently in process ("in flight") must be stored during the pendency of the long-latency instruction, typically requiring large store queues (e.g., L1 and L2 store queues). These store queues can grow with increased instruction processing.

Moreover, in order to search these store queues, extra logic, such as CAM logic, may be necessary. Particularly, load operations searching for a corresponding store operation having data to satisfy the load operations, typically search a relatively large store queue using CAM logic that increases in size with the size of the queue.

Searching a large store queue that has CAM logic can potentially increase cycle time or increase the number of cycles it takes to access the store queue. Further, using searchable store queues to forward store data to the proper load instruction can become increasingly difficult to accommodate as the number of in-flight instructions increase during processing of a long-latency instruction, such as a load servicing a miss. Moreover, search logic, such as CAM logic, typically associated with searchable store queues can require excess power, die real estate, and processing cycles in order to satisfy independent load operations during other pending long-latency operations.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to a technique to service instructions that are independent of high-latency instructions, such as a load instruction accessing DRAM to retrieve load data. More particularly, embodiments of the invention relate to a technique to match store data to load operations while high-latency operations are pending without using a searchable memory device.

At least one embodiment of the invention replaces a second-level ("L2") queue having associated content addressable memory (CAM) logic in favor of a first-in-first-out (FIFO) queue that holds store operations (both dependent and independent) in the shadow of a long-latency operation or operations that is/are being performed at a certain time. A FIFO queue has the potential to use less power, because the FIFO queue does not require a search and associated search logic, as does a typical CAM structure. Furthermore, independent loads are forwarded data from the L1 data cache to help maintain performance in at least one embodiment.

Figure 1:
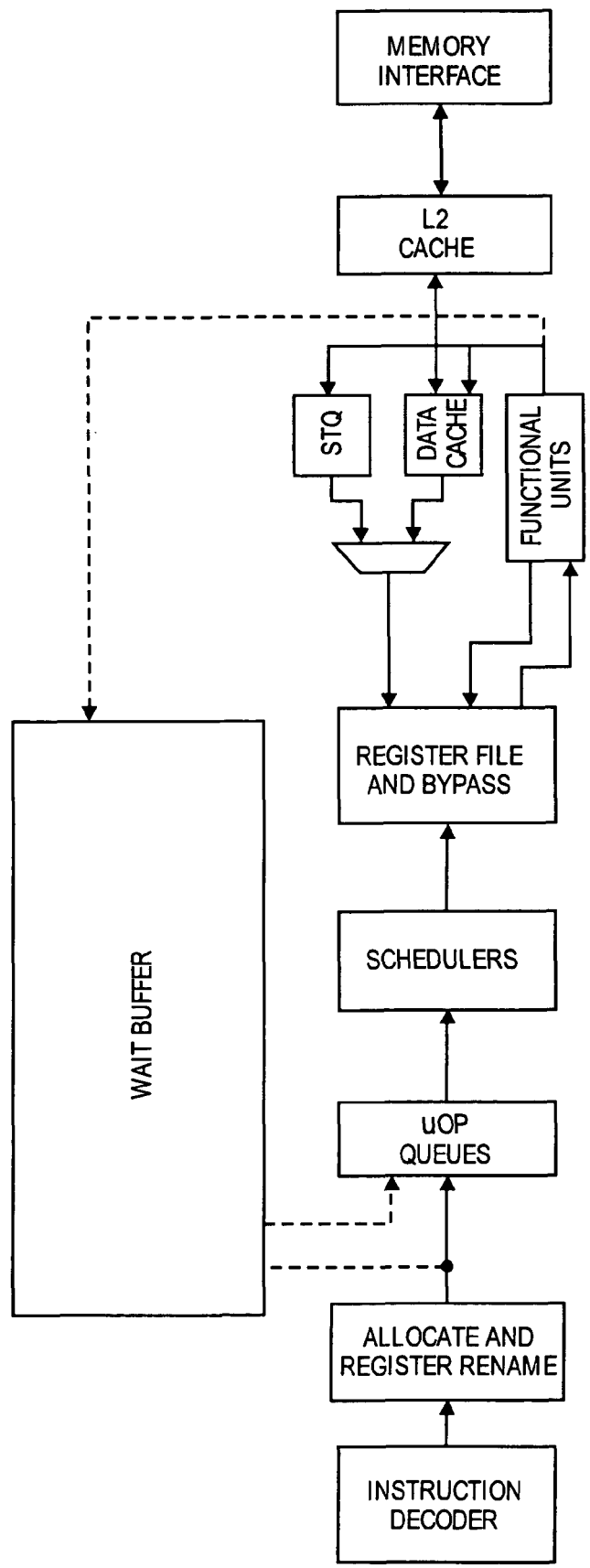
FIG. 1 illustrates a prior art architecture for satisfying independent operations during pending long-latency memory access operations, such as load operations, within a microprocessor.
Figure 2:
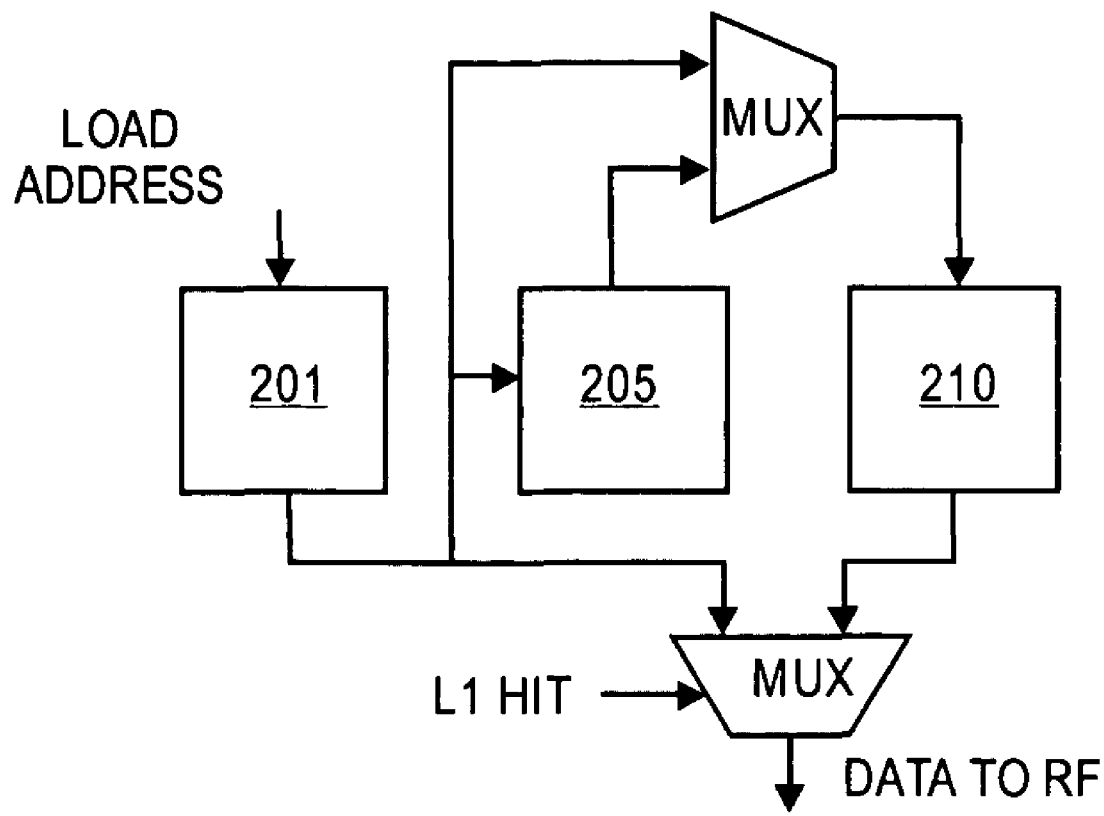
FIG. 2 illustrates an architecture, according to one embodiment of the invention, to allow independent operations to be satisfied without using a searchable memory structure.

FIG. 2 illustrates one embodiment of the invention in which a FIFO queue is used to store stores while an operation or operations is accessing a relatively slow-access memory, such as dynamic random access memory (DRAM), due to a cache miss. More particularly, FIG. 2 illustrates a first-level ("L1") store queue 201 in which various instructions or micro-operations are stored. If an operation, such as an instruction or micro-operation, cannot retrieve its required data from a relatively fast-access memory, such as a data cache, thereby creating a cache miss condition, it may resort to other memory, such as DRAM or an upper level, and often slower, cache memory to retrieve the data. An operation, such as an instruction or micro-operation, that accesses a relatively slow-access memory source, such as DRAM, is hereafter referred to as a "high-latency" operation, instruction, or micro-operation. During the time that the high-latency operation is attempting to retrieve the memory from another source, operations that are independent of the high-latency operation (hereinafter referred to as "independent operations") should not be gated by the high-latency operation or operations dependent upon the high-latency operation (hereinafter "dependent operations"), but should be allowed to complete, as they are not dependent on the high-latency operation.

Accordingly, FIG. 2 illustrates a store redo log (SRL) 205 to store operations that occur after the long-latency operation in program order. Unlike the prior art, the SRL does not contain CAM logic or any other logic necessary to search the SRL, but instead the SRL stores independent and dependent store operations in the order in which they appear in a program, so that they may be read out in program order when needed. In one embodiment, the SRL is a FIFO queue. In other embodiments, however, the SRL may be other memory structures that are not required to be searched in order for instructions or micro-operations to be retrieved from the memory structure.

In one embodiment of the invention, independent load operations may be satisfied by independent store operations from the L1 store queue 201 or from the L1 data cache 210 before the high-latency operations is satisfied, by storing the desired independent store data in the L1 store queue or in the L1 data cache 210. The data cache can act as a temporary storage location for the data to be used by the independent load operations, and may be replaced with data corresponding to the long-latency operation or dependent operations after the high-latency operation is complete, depending on program order. Furthermore, any data that was stored previously in a location ("dirty blocks") in the data cache that is being written by an independent store operation, can be stored away into another memory structure, such as an L2 cache, and returned to the data cache after the long latency operation completes.

FIG. 2 also illustrates a wait buffer to store the dependent operations while the high-latency operation is still pending. The wait buffer may be a FIFO in some embodiments. However, in other embodiments, the wait buffer may be other types of memory structures. After the high-latency operation is satisfied, dependent and independent data (including data already once written to the data cache to satisfy load operations) are be reassembled in program order within the data cache. In one embodiment of the invention, the data is reassembled in the data cache by writing the data from the SRL in program order. After the data corresponding to the high-latency operation is written to the appropriate location in the data cache, the data of store operations stored in the SRL may be sequentially read out of the SRL and stored into the data cache in the appropriate location without having to search the SRL for the appropriate data.

Because all data, corresponding to both independent and dependent operations, can be read sequentially from the SRL, the data can be retrieved faster and with less power consumed than in prior art techniques using memory structures, such as an L2 store queue, to store the independent and dependent instructions or micro-operations. Furthermore, the SRL may be smaller than prior art structures, as the SRL contains no search logic, such as CAM logic.

Figure 3:
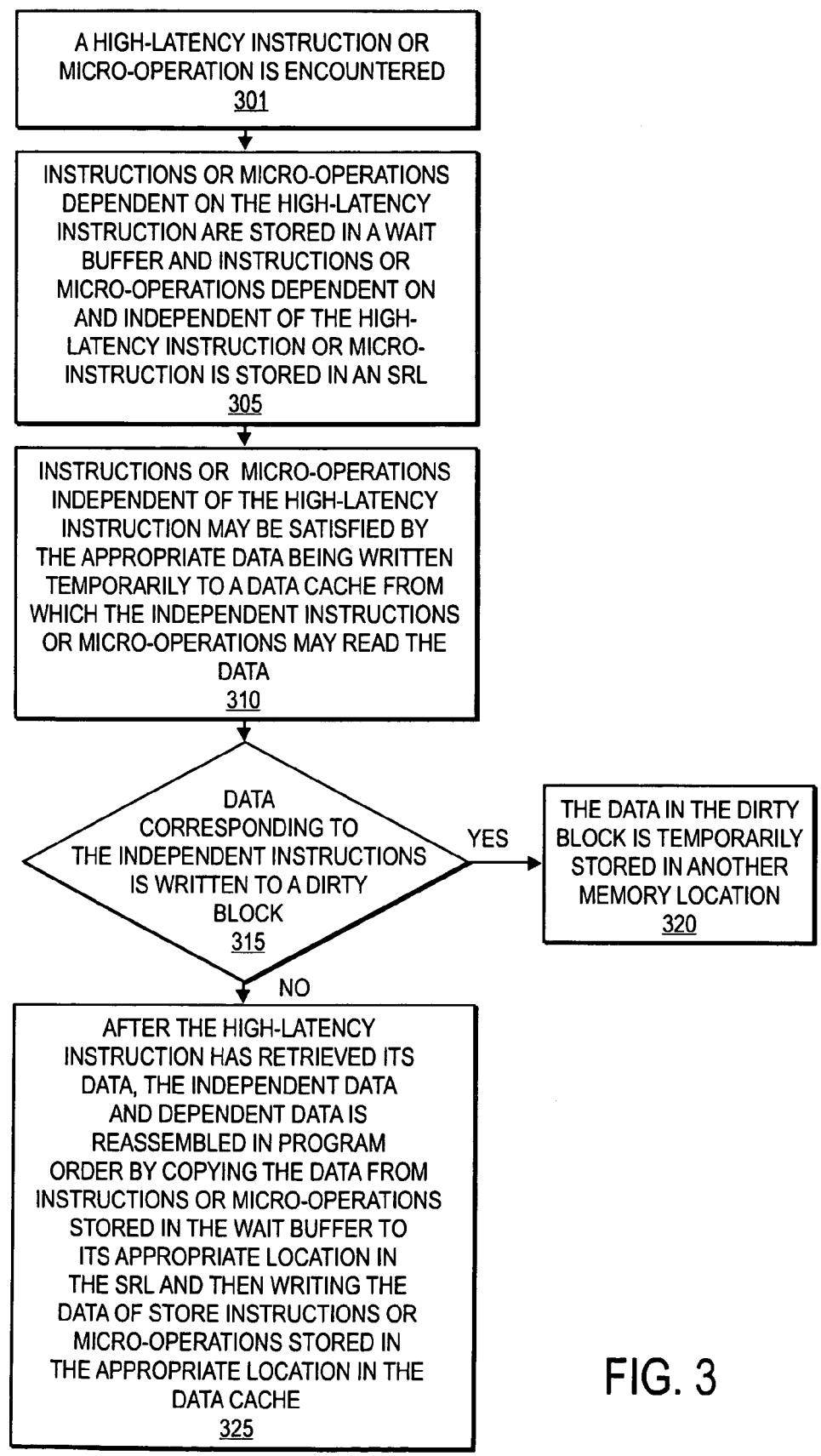
FIG. 3 is a flow diagram illustrating operations that may be involved in one embodiment of the invention.

FIG. 3 is a flow diagram illustrating a sequence of operations that may be used in one embodiment of the invention to carry out an embodiment, such as the one illustrated FIG. 2. At operation 301, a high-latency instruction or micro-operation is encountered, causing the instruction to resort to relatively high latency memory, such as DRAM, to retrieve data that the instruction or micro-operation requires. While the high-latency instruction or micro-operation is accessing the data it needs (i.e. the instruction or micro-operation is "pending"), instructions or micro-operations dependent on the high-latency instruction are stored in a wait buffer and store instructions or micro-operations dependent on and independent of the high-latency instruction or micro-operation is stored in an SRL at operation 305.

Instructions or micro-operations independent of the high-latency instruction may write the appropriate data temporarily to a data cache from which the independent instructions or micro-operations may read the data at operation 310. If the data corresponding to the independent instructions is written to a dirty block at operation 315, then the data in the dirty block is temporarily stored in another memory, such as an L2 cache, at operation 320. After the high-latency instruction has retrieved its data, the independent data and dependent data may reassembled in program order by copying the data from instructions or micro-operations stored in the wait buffer to its appropriate location in the SRL and then writing the data of store instructions or micro-operations stored in the SRL to the appropriate location in the data cache, such that the data is stored in program order at operation 325.

Figure 4:
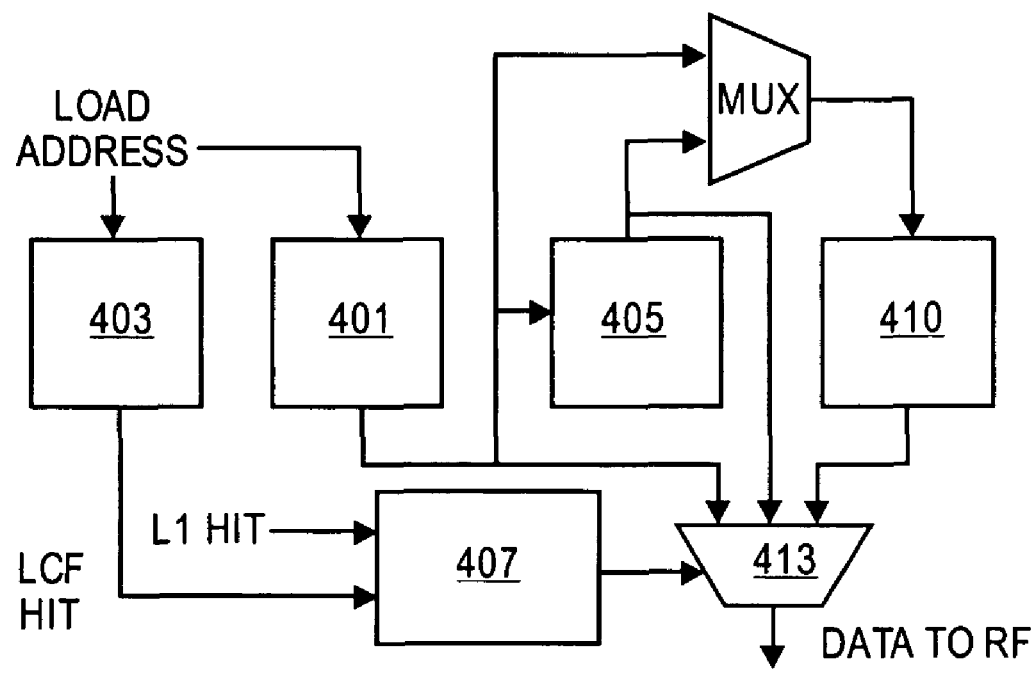
FIG. 4 illustrates an architecture, according to one embodiment, including a loose-check filter to allow independent operations to be satisfied without using a searchable memory structure.

FIG. 4 illustrates one embodiment of the invention in which a loose-check filter (LCF) 403 is used to discern whether the SRL 405 contains instructions or micro-operations having data to satisfy a particular load operation. The output of the LCF is connected to a mux 407, which can select data directly from the SRL without the data having to first be copied to the data cache 410 as in the embodiment illustrated in FIG. 3. As in the embodiment of FIG. 3, the data may be selected and written to a register file (not shown) via mux 413 from the L1 queue 401 or the data cache.

In one embodiment of the invention, the LCF is a direct-mapped non-tagged counter array indexed by a hash function of a memory address. An insertion of store operations into the SRL increments the corresponding LCF counter and a store operation removal from the SRL decrements the LCF counter. A non-zero LCF counter value suggests a possible matching store operation in the SRL, while a zero LCF counter value guarantees the absence of a matching store operation. By allowing load operations to match data in the SRL through the LCF, load operations may stall only on an LCF match to a non-zero value.

The LCF may cause some load operations to stall unnecessarily, but to reduce such stall cases, indexed forwarding may be used in the SRL. Because many stalled load operations are recently fetched load operations appearing after the high-latency operation, but before the all store operations in the SRL have had their data stored into the data cache, a forwarding store operation in the SRL is often the last matching store operation inserted into the SRL. Therefore, in one embodiment, the LCF is extended to also store the SRL index of the last inserted store operation associated with the corresponding LCF counter. In such an embodiment, an incoming load operation needing store data corresponding to a store operation in the SRL can quickly locate the last potentially matching store data entry in the SRL. The load operation can read this entry and perform complete address and age checking without requiring a search of the SRL via CAM logic or some other logic. Furthermore, only one address comparator may be required for the entire SRL in such an embodiment.

In some instances, loads may be predicted to be independent of a high latency instruction, but may ultimately be dependent upon a dependent store instruction. For example, if the high latency instruction is a load instruction, subsequent load instructions that are not dependent upon the high latency load instruction may be dependent upon dependent store instructions. In this case, a load instruction that is satisfied with data from an independent store instruction may by satisfied with the wrong data if there are dependent store operations that appear prior to the satisfied load instruction in program order having more current data for the satisfied load instruction than the data with which the load was satisfied.

Figure 7:
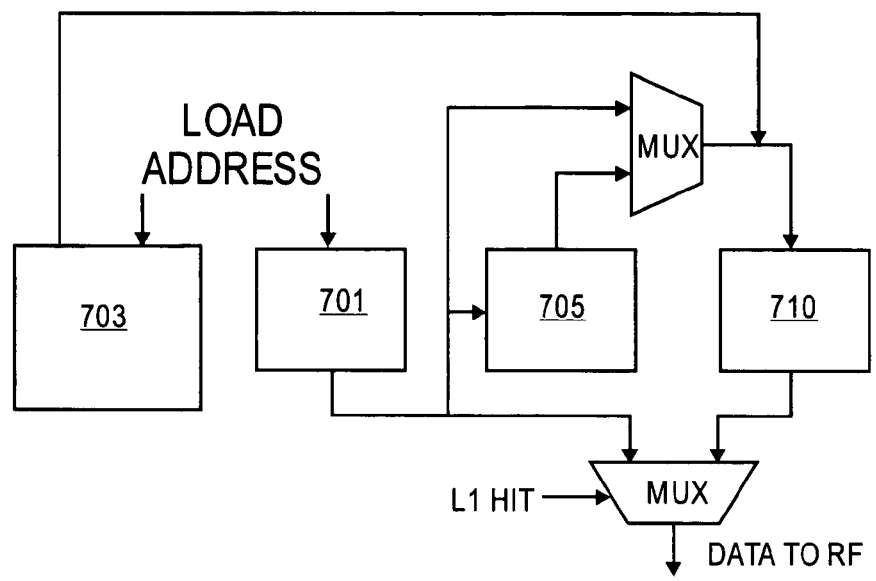
FIG. 7 illustrates an architecture, according to one embodiment, using a load buffer to store load addresses corresponding to matching store addresses.

FIG. 7 illustrates one embodiment of the invention having a load buffer to store target addresses of load instructions, which can be compared to target addresses of store instructions that are in flight and are to be stored in the SRL 705 or queue 701 to determine whether the satisfied load instruction actually has the most current store data. Specifically, load buffer 703 is used to store target load addresses corresponding to load operations and can be compared to target store addresses of store instructions in route to the SRL or the queue, effectively "snooping" the in-flight store target address.

The target addresses stored in the load buffer are compared against those of the store instructions in route to the SRL or queue, and a matching entry within the load buffer that is subsequent to a store instruction in program order sharing the same target address indicates that the load instruction is not to be satisfied with the data it retrieved from the data cache 710. In one embodiment, the load buffer is a set-associative buffer, whereas in other embodiments other storage structures may be used.

If a store is encountered within the SRL that does not correspond to the store data retrieved by the load operation from the data cache and subsequent in program order to the instruction corresponding to the retrieved from the data cache but prior to in program order the load operation, a misprediction recovery scheme can be used to retrieve the most current store data. In one embodiment, the load instruction can be satisfied with the most current store data in the SRL to which it corresponds by flushing the processing pipeline of instructions back to a certain point in execution order indicated by a checkpoint stored in an entry within the load buffer.

Figure 8:
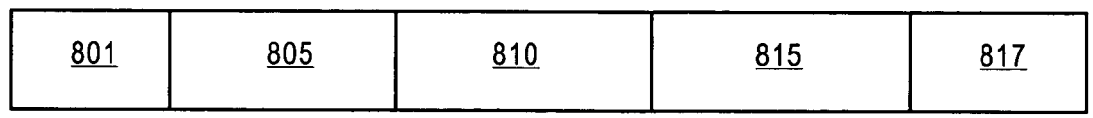
FIG. 8 illustrates an entry of the load buffer of FIG. 7, according to one embodiment.

FIG. 8 illustrates an entry of the load buffer, according to one embodiment, in which each load buffer entry contains a physical address tag 801 that is compared against the corresponding address fields of the store operations in the SRL. Each entry also contains a valid bit 805, to indicate whether the entry contains a valid load address, an identification field 810 to indicate where execution is to resume after a load operation is incorrectly satisfied with store data from the data cache ("checkpoint"), and a store buffer identification field 815 to indicate the address of a prior store instruction closest to the load instruction in program order, and a store buffer identification field 817 indicating a store that from which the load was previously satisfied.

In one embodiment of the invention, the load buffer entries are checked against the store operations stored in the SRL before each load operation to be satisfied reads data from the data cache. In other embodiments, this check is done after a load operation retrieves data from the data cache. Because the load buffer is set associative, instead of fully associative, for example, at least one embodiment is able to compare load addresses to corresponding store address in the SRL relatively quickly, such that the comparison can be made during a memory access cycle of a high-latency load operation.

Figure 5:
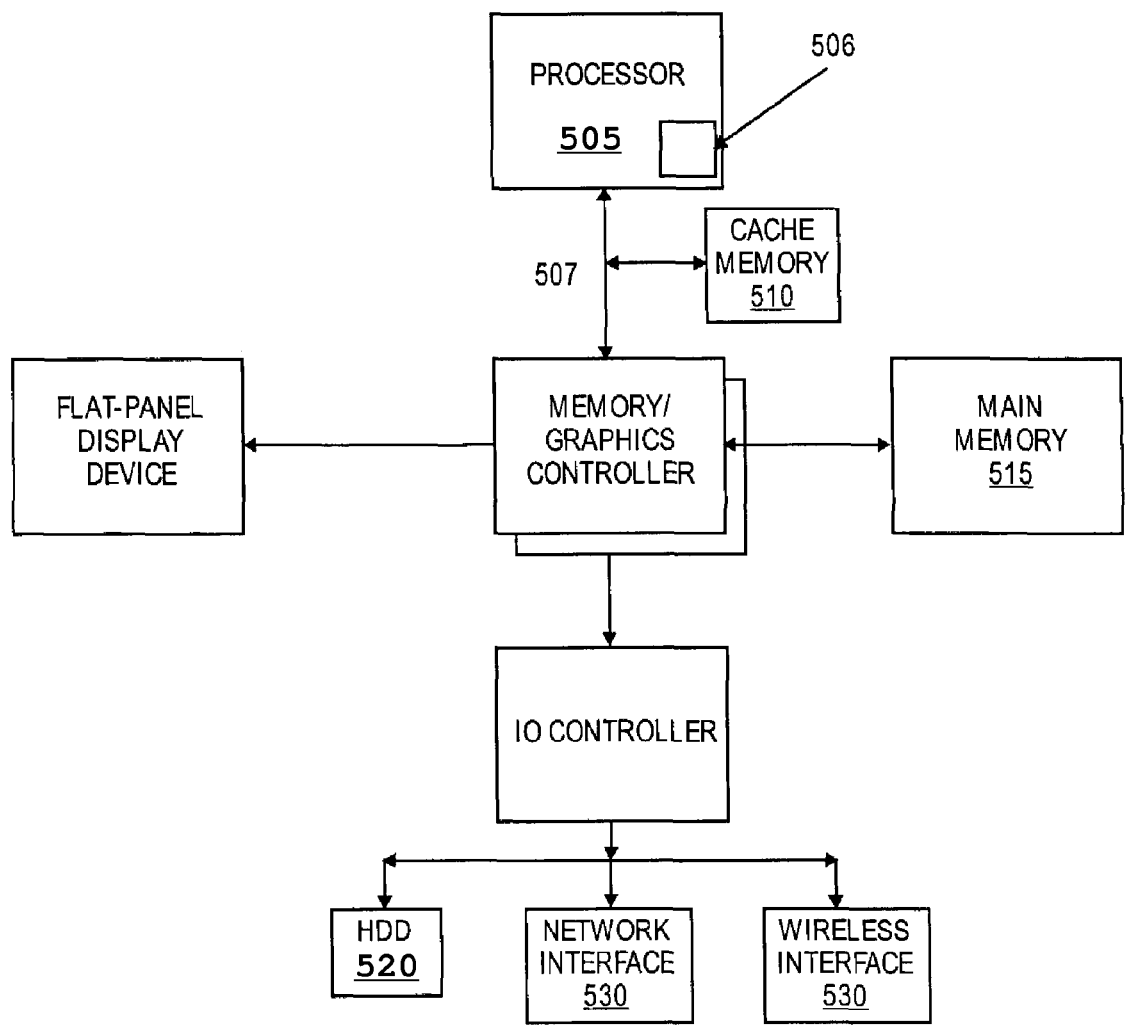
FIG. 5 is shared bus computer system in which one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache, which comprise an inclusive cache hierarchy in which coherency data is shared between the L1 and L2 caches.

Illustrated within the processor of FIG. 5 is one embodiment of the invention 506. In some embodiments, the processor of FIG. 5 may be a multi-core processor.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507. Furthermore, the cache memory may contain relatively fast memory cells, such as a six-transistor (6T) cell, or other memory cell of approximately equal or faster access speed.

The computer system of FIG. 5 may be a point-to-point (PtP) network of bus agents, such as microprocessors, that communicate via bus signals dedicated to each agent on the PtP network. Within, or at least associated with, each bus agent is at least one embodiment of invention 506, such that store operations can be facilitated in an expeditious manner between the bus agents.

Figure 6:
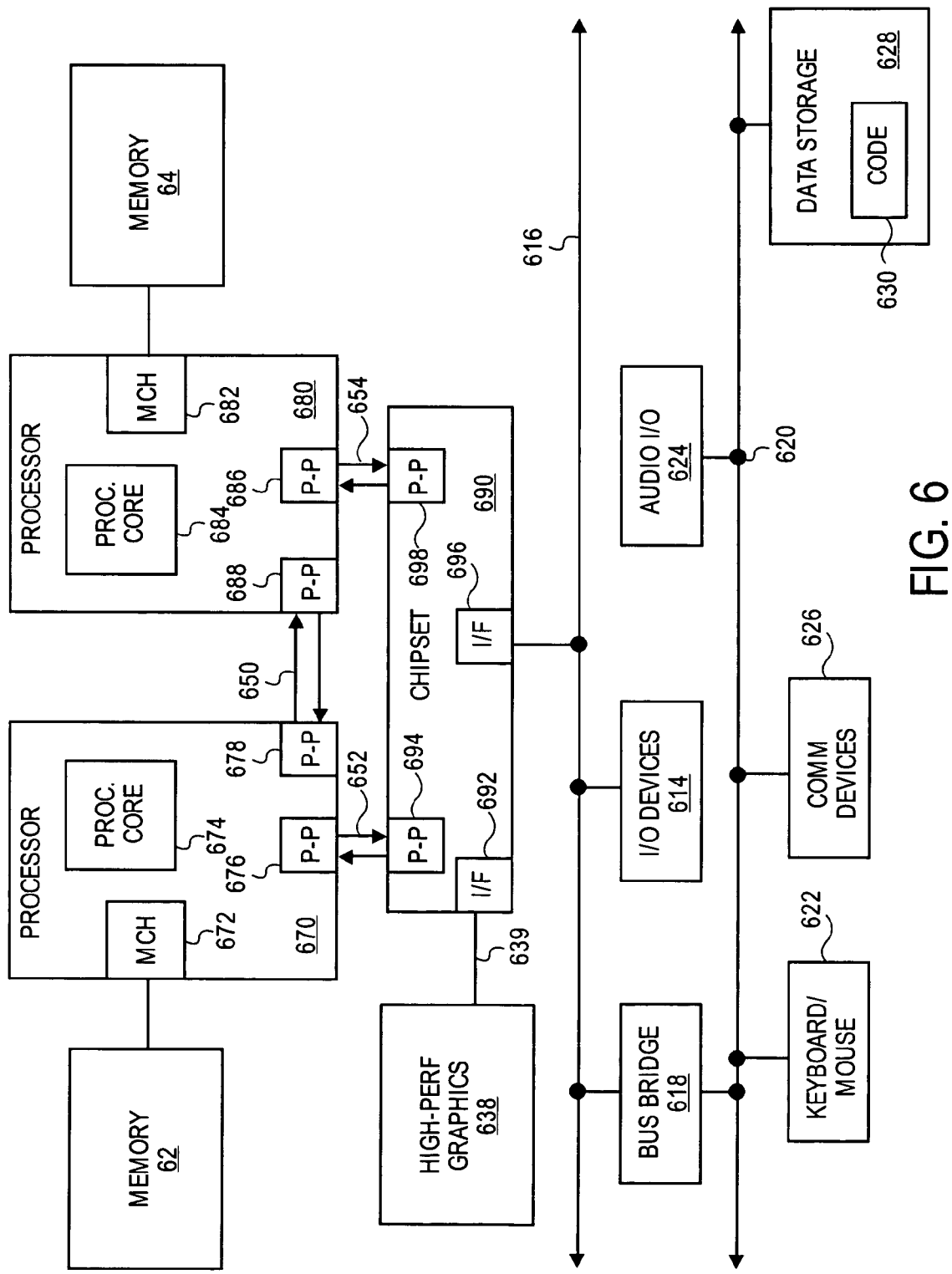
FIG. 6 is a point-to-point computer system in which one embodiment of the invention may be used.

FIG. 6 illustrates a computer system that is arranged in a point-to-point (PtP) configuration. In particular, FIG. 6 shows a system where processors, memory, and input/output devices 614 are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 692 via coupling 639.

At least one embodiment of the invention may be located within the processors 670 and 680. Other embodiments of the invention, however, may exist in other circuits, logic units, or devices within the system of FIG. 6. Furthermore, other embodiments of the invention may be distributed throughout several circuits, logic units, or devices illustrated in FIG. 6. Furthermore, as shown in FIG. 6, the system may include a bus 616, a bus bridge 618, a bus 620, a keyboard/mouse 622, an audio I/O 624, communication device 626, data storage 628, code 630 (shown on the data storage 628), and processor cors 674, 684.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
    a first storage device to store a plurality of store operations in program order during a time in which a high-latency operation is accessing data from a second storage device, wherein the high-latency operation is to be issued in response to a cache miss and wherein the plurality of store operations may comprise a dependent store operation, dependent on the high-latency operation, and an independent store operation, independent of the high-latency operation; and
    a third storage device to store an independent load operation, wherein the independent load operation is to retrieve data corresponding to an independent store operation after the high-latency operation has been issued and before the high-latency operation has accessed data from the second storage device and without searching the first storage device.

2. The apparatus of claim 1 further comprising a fourth storage device to store data associated with the plurality of store operations after the high-latency operation has accessed the data from the second storage device.

3. The apparatus of claim 1 wherein the independent load operation is to access the data corresponding to the operation stored in a fourth storage device.

4. The apparatus of claim 3 wherein the first storage device comprises a first-in-first out queue and the fourth storage device comprises a level-1 (L1) store queue.

5. The apparatus of claim 4 wherein the second storage device comprises dynamic random access memory (DRAM).

6. The apparatus of claim 5 further comprising loose count filter to allow independent load operations to be satisfied without reading data from the third device.

7. The apparatus of claim 1, wherein data associated with the dependent store operations and data associated with independent store operations are to be reassembled based on the program order.

8. The apparatus of claim 1, wherein data for the load instruction is to be retrieved from corresponding store data in the first storage device in response to a pipeline flush to a point in execution order, wherein the point is to be indicated by a checkpoint stored in an entry within a load buffer.

9. A method comprising:
    issuing a high-latency instruction in response to a cache miss;
    storing a plurality of store instructions that are subsequent to the high-latency instruction in a
        first-in-first-out queue in program order, wherein the plurality of store operations may comprise a dependent store operation, dependent on the high-latency operation, and an independent store operation, independent of the high-latency operation;
    satisfying a load instruction that is independent of the high-latency instruction with data of a store instruction that is independent of the high-latency instruction while the high-latency instruction is retrieving data and without searching the first-in-first-out queue.

10. The method of claim 9 further comprising storing data temporarily in a data cache or a level-1 (L1) store queue while the high-latency instruction is retrieving data so that the load instruction can read the temporarily stored data.

11. The method of claim 10 wherein if the data is stored to an area of the data cache corresponding to previously stored valid data, the previously stored valid data is temporarily stored in another memory location and later returned to the area of the data cache.

12. The method of claim 10 wherein the data used to satisfy the load instruction is data corresponding to an instruction stored in the L1store queue.

13. The method of claim 12 wherein the instruction stored in the first-in-first-out queue, having data used to satisfy the load instruction, is independent of the high-latency instruction.

14. The method of claim 9 wherein the first-in-first-out buffer stores independent and dependent store instructions in program order such that the buffer contents can be stored in a data cache in program order.

15. The method of claim 14 wherein the high-latency instruction is retrieving data from dynamic random access memory.

16. The method of claim 9, further comprising reassembling data associated with the dependent store operations and data associated with independent store operations based on the program order.

17. A system comprising:
    a memory to store a first data;
    a processor to perform a high-latency operation to retrieve the first data in response to a cache miss;
    a queue to store a plurality of store instructions in program order
        while the high-latency operation is retrieving the first data wherein the plurality of store instructions may comprise a dependent store operation, dependent on the high-latency operation, and an independent store operation, independent of the high-latency operation;
    a cache to temporarily comprise store data corresponding to at least one of the plurality of store instructions, the store data to satisfy a load instruction that is independent of the high-latency operation and without searching the queue;
    a set-associative load buffer to store addresses corresponding to the load instructions, which are to be compared with target addresses of the store instructions.

18. The system of claim 13 wherein the cache is to store the plurality of data corresponding to the store instructions in program order after the high-latency instruction is complete and after the plurality of store instructions have been read from the queue.

19. The system of claim 13 further comprising a loose count filter to allow the load operation to be satisfied from data stored in the queue instead of reading the data after it has been stored in the data cache.

20. The system of claim 13 wherein the memory to store a first data comprises dynamic random access memory.

21. The system of claim 20 wherein the queue is a first-in-first-out queue.

22. The system of claim 21 wherein the loose count filter comprises a directly mapped non-tagged counter array indexed by a hash function of a memory address.

23. The system of claim 22 wherein if a store instruction is stored in the queue, a corresponding counter in the loose count filter is incremented.

24. The system of claim 17, wherein data associated with the dependent store instructions and data associated with independent store instructions are to be reassembled based on the program order.

25. A machine-readable medium having stored thereon a set of instructions, which if executed by a machine, cause the machine to perform a method comprising:

storing a plurality of store operations in program order in a first-in-first-out (FIFO) queue in response to a memory access instruction requiring more than a minimum time to be performed, wherein the memory access instruction is to be issued in response to a cache miss;

retrieving the plurality of store operations from the FIFO queue and storing their data in a data cache in program order without having to search the FIFO queue in response to the memory access instruction completing wherein the plurality of store operations may comprise a dependent store operation, dependent on the high-latency operation, and an independent store operation, independent of the high-latency operation.

26. The machine-readable medium of claim 25 wherein load operations independent of the memory access instruction are to access store data corresponding to store instructions stored in a level-1 (L1) store queue while the memory access instruction is being performed.

27. The machine-readable medium of claim 26 wherein the load operations are to access the store data from a data cache.

28. The machine-readable medium of claim 26 wherein the load operations are to access the store data from the FIFO queue if loose count filter indicates that the data is present in the FIFO queue.

29. The machine-readable medium of claim 26 wherein the method further comprises comparing an address associated with at least one of the load operations with an address of the store operations to determine which of the store operations corresponds to a most current data corresponding to the at least one load operation.

30. The machine-readable medium of claim 29 wherein the method further comprises executing operations starting from a checkpoint corresponding to an operation appearing before the at least one load operation in program order.

31. The machine-readable medium of claim 30 wherein addresses associated with the load operations are to be stored in a set-associative buffer.

32. The medium of claim 25, wherein data associated with the dependent store operations and data associated with independent store operations are to be reassembled based on the program order.

* * * * *

UNITED STATES PATENT AND TRADEMARK OFFICE
CERTIFICATE OF CORRECTION

| | | |
|---|---|---|
| PATENT NO. | : 7,900,023 B2 | Page 1 of 1 |
| APPLICATION NO. | : 11/015874 | |
| DATED | : March 1, 2011 | |
| INVENTOR(S) | : Ravi Rajwar et al. | |

It is certified that error appears in the above-identified patent and that said Letters Patent is hereby corrected as shown below:

In column 7, line 36, in Claim 4, delete "first-in-first out" and insert -- first-in-first-out --, therefor.

In column 8, line 48, in Claim 18, delete "claim 13" and insert -- claim 17 --, therefor.

In column 8, line 53, in Claim 19, delete "claim 13" and insert -- claim 17 --, therefor.

In column 8, line 57, in Claim 20, delete "claim 13" and insert -- claim 17 --, therefor.

Signed and Sealed this
Seventh Day of June, 2011

David J. Kappos
*Director of the United States Patent and Trademark Office*